Figure 2:
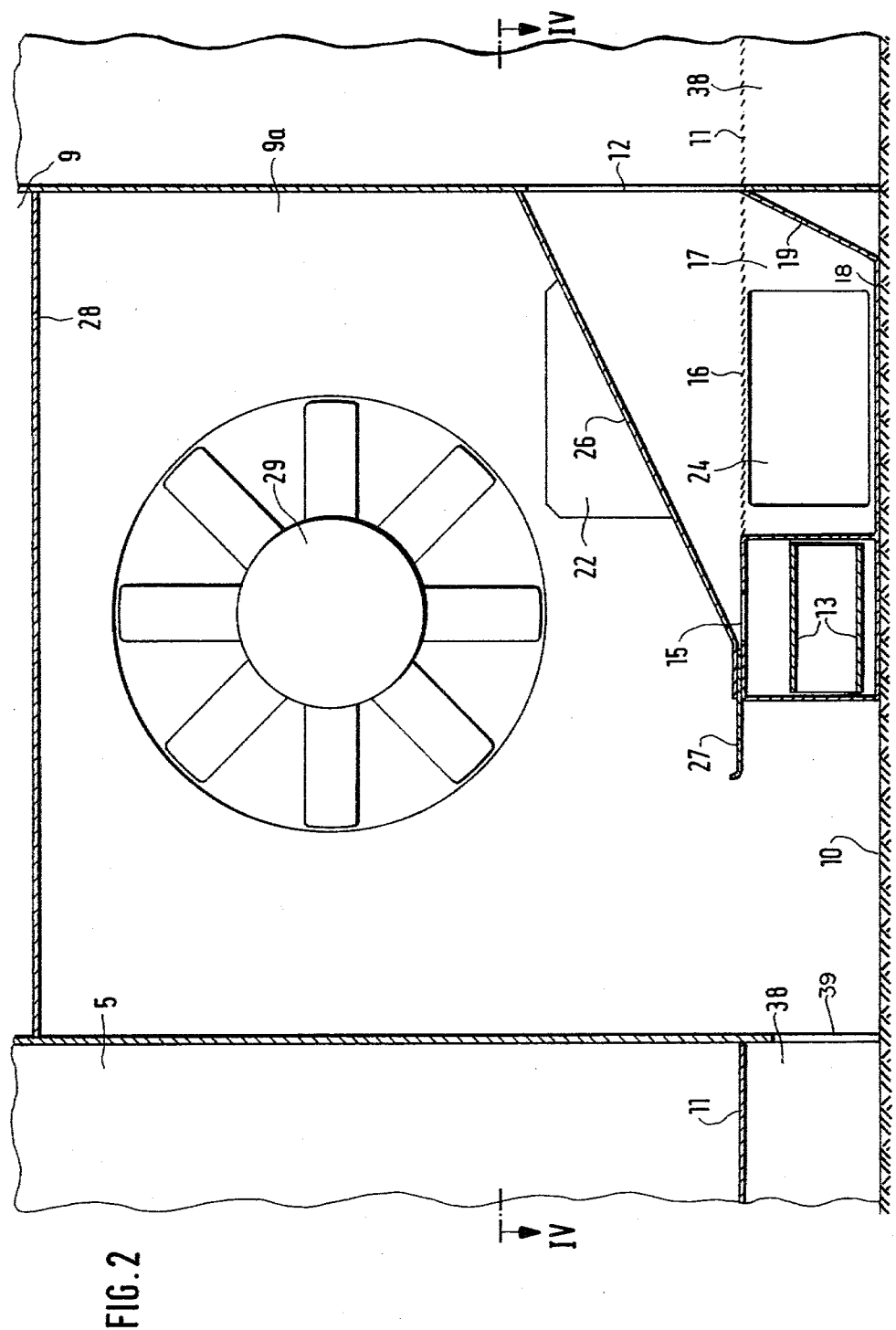

United States Patent [19]

Persson

[11] 4,242,015
[45] Dec. 30, 1980

[54] APPARATUS FOR CONVEYING GRANULAR MATERIAL

[76] Inventor: Sven J. Persson, Surbrunnsgatan 4, 532 00 Skara, Sweden

[21] Appl. No.: 1,723

[22] Filed: Jan. 8, 1979

[51] Int. Cl.³ ............... B65G 53/20; B65G 53/44
[52] U.S. Cl. ........................... 406/82; 406/90; 406/146
[58] Field of Search .......... 406/77, 82, 86, 88, 406/89, 90, 120, 146, 155

[56] References Cited

U.S. PATENT DOCUMENTS

| | | | |
|---|---|---|---|
| 2,492,585 | 12/1949 | Kohout | 406/89 X |
| 3,304,619 | 2/1967 | Futer | 406/88 X |
| 4,123,114 | 10/1978 | Rataj et al. | 406/86 |

FOREIGN PATENT DOCUMENTS

| | | | |
|---|---|---|---|
| 1204423 | 1/1960 | France | 406/89 |
| 1195201 | 6/1970 | United Kingdom | 406/90 |
| 1354093 | 5/1974 | United Kingdom | 406/86 |
| 1420068 | 1/1976 | United Kingdom | 406/90 |
| 1444818 | 8/1976 | United Kingdom | 406/89 |

Primary Examiner—James L. Rowland

[57] ABSTRACT

Apparatus for removal of granular material from laterally spaced rows of containers having discharge ports whose lower edges are on a level with each other. A conveyor is in the space between the rows of containers substantially on a level with or slightly below the lower edges of the discharge ports. A tubular housing encloses the conveyor provided with inlet ports in its upper wall corresponding to the discharge ports of the containers and has an outlet orifice at the end of the conveyor. Sheet members bridge the gaps between the lower edges of the discharge ports and the adjacent edges of the upper wall of the tubular housing to form a roof of a chamber which is connected to the pressure side of a fan. There are slits in the sheet members providing upper orifices facing away from the discharge ports whereby the air current discharged from the chamber through the orifices will tend to move the material emerging from a discharge port towards the corresponding inlet port of the housing.

7 Claims, 8 Drawing Figures

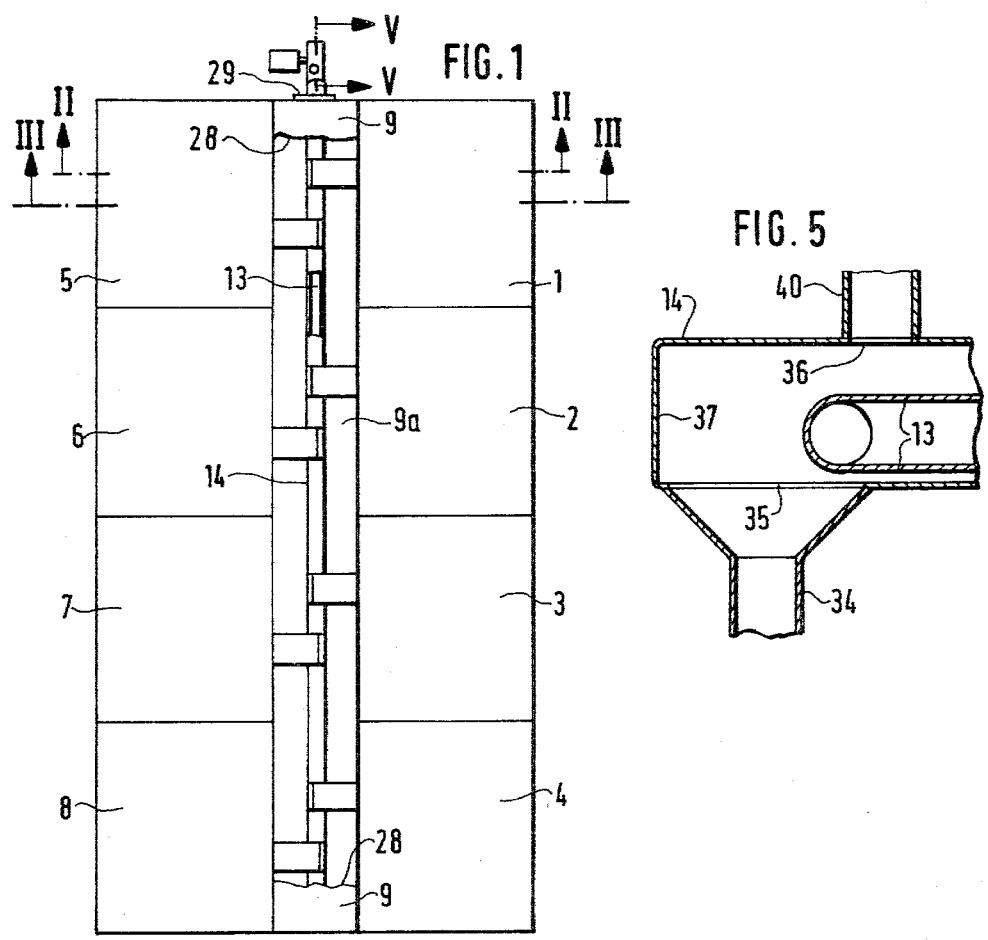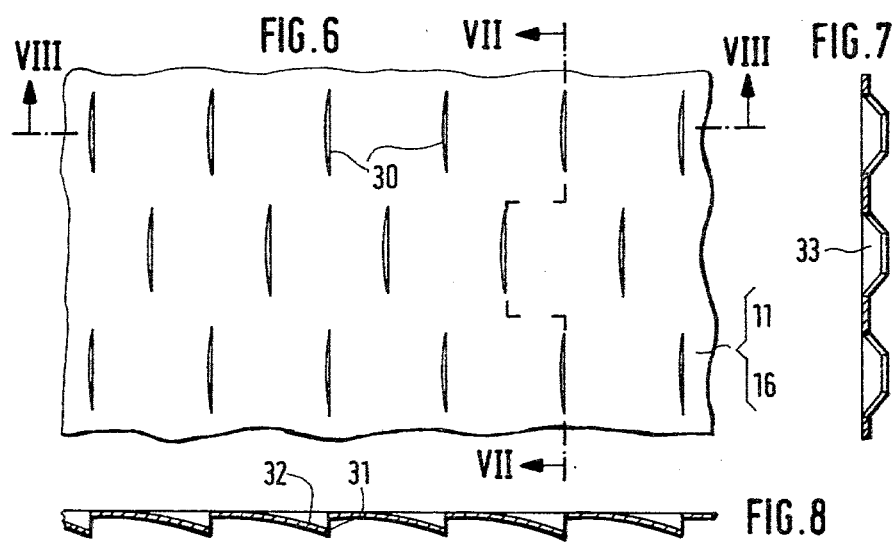

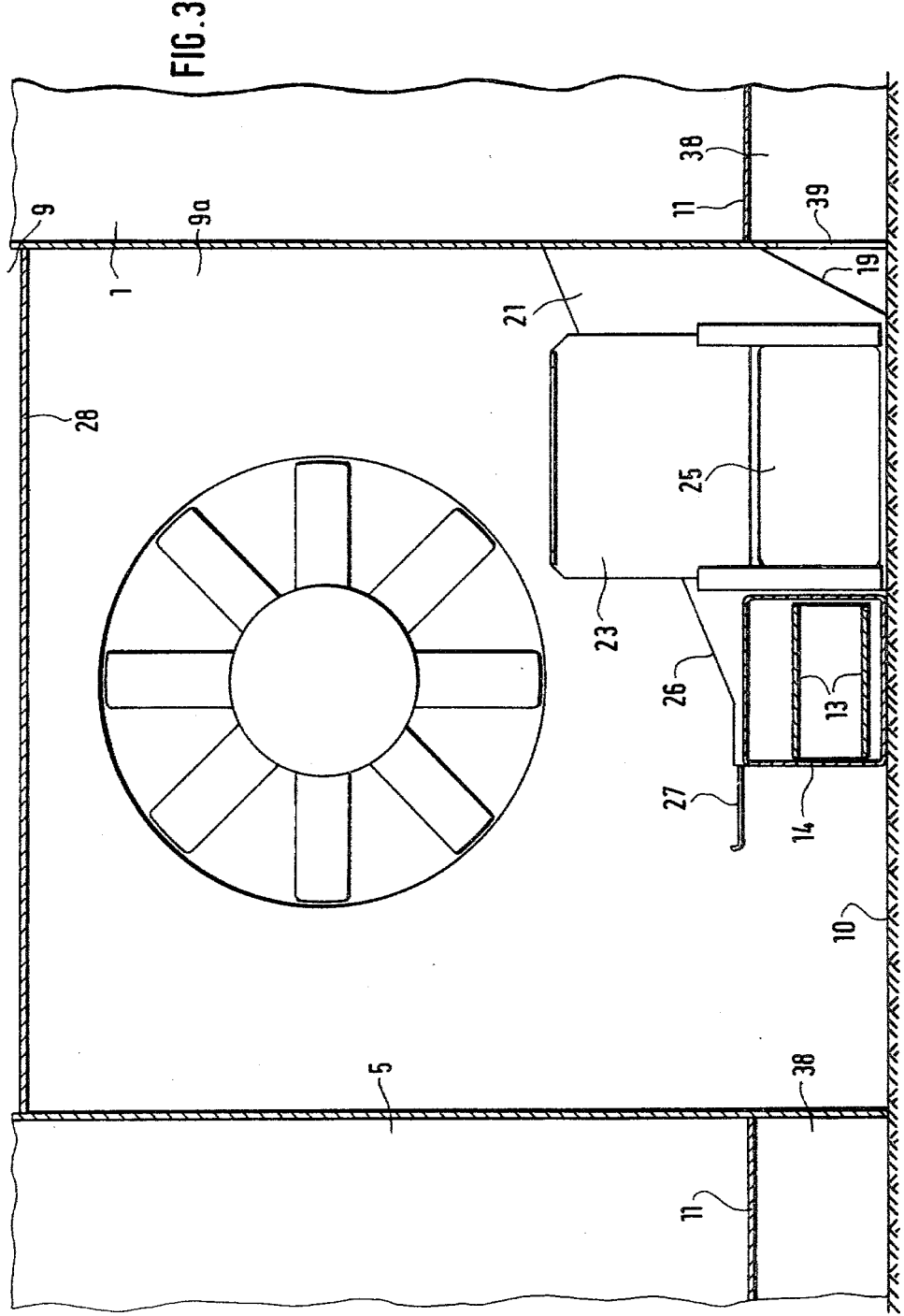

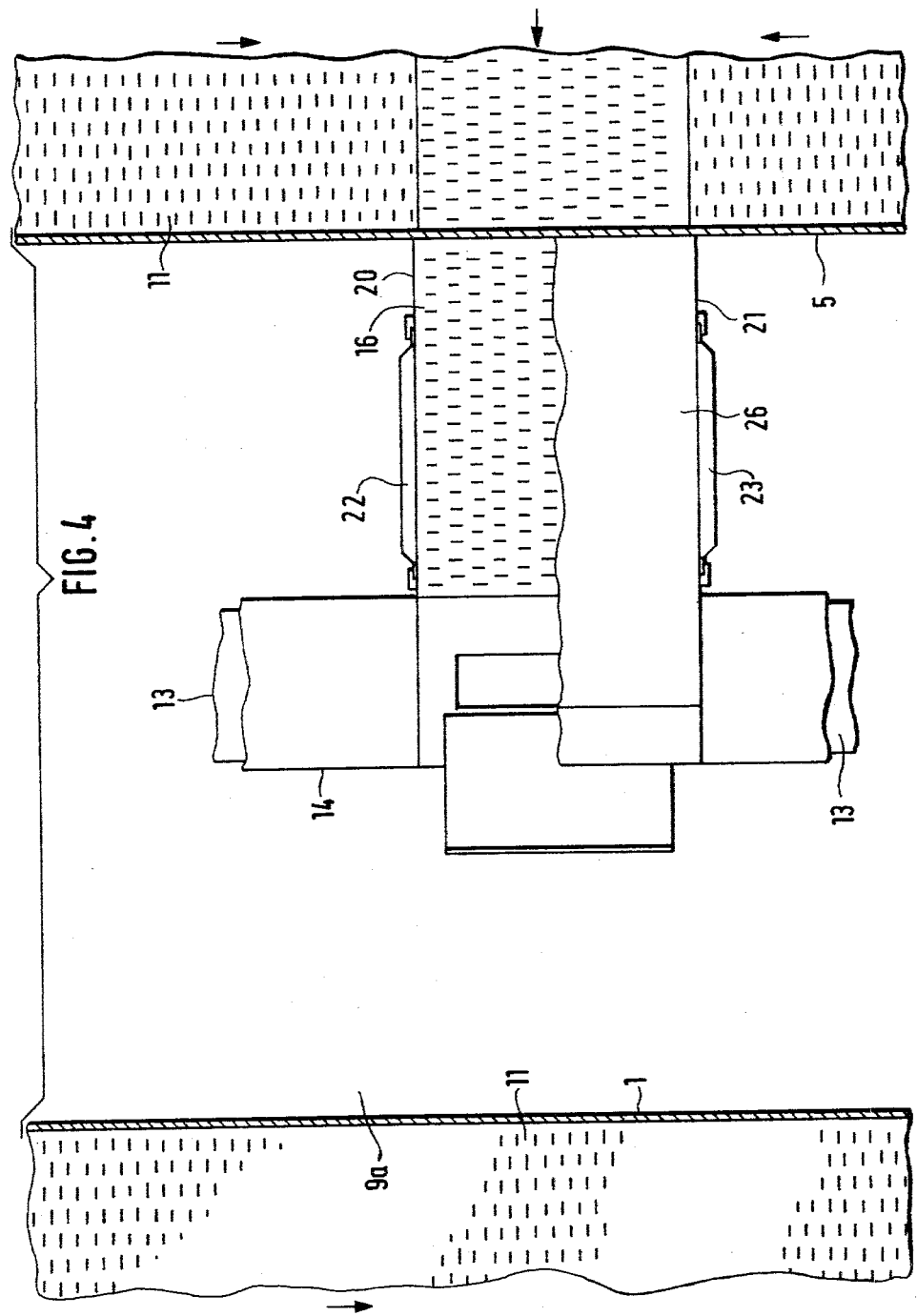

APPARATUS FOR CONVEYING GRANULAR MATERIAL

The invention relates to apparatus for conveying granular material, more particularly to apparatus for conveying the granular material from a container or bin to a conveyor laterally spaced from said container or bin. Such a location of the conveyor with respect to the container or bin occurs in practice in, for instance drying or storing plants in which a plurality of containers or bins form a row along a common conveyor, or form two rows at either side of the conveyor. The lateral transport of the material from the container or bin to the conveyor under the action of gravity in a chute or the like demands a certain level difference which can be obtained by sinking the conveyor into the floor and/or providing a sufficiently high supporting structure for the container or bin. Both of these expedients cause an additional cost which in practice can be considerable.

The new apparatus according to the invention is distinguished thereby that the conveyor member supporting the granular material is arranged substantially on a level with or only slightly lower than the lower edge of a discharge port in the lateral wall of the container or bin and that a substantially horizontal sheet is arranged between said lower edge and the conveyor, said sheet forming the roof of a chamber arranged to be connected to the pressure side of a fan and being provided with a large number of slit-shaped orifices the upper ends of which are substantially vertical and face the conveyor, whereby the current of gas discharged through said orifices effects a transport of the granular material from said discharge port to the conveyor.

The expression "only slightly lower than" indicates that the level difference must be substantially lower than the one required for a chute or the like.

The invention can be applied with particular advantage in such drying or storing plants which are provided with a ventilating system including a fan for forcing a current of drying or cooling air or any other gas through the stored material, as in this case no particular fan is required for the apparatus according to the invention.

An embodiment of the invention shall now be described by way of example with reference to the appended drawing in which FIG. 1 is a schematical plan view of a grain drying and storing plant provided with the apparatus according to the invention, FIGS. 2 and 3 are sections on a larger scale than FIG. 1 taken on the lines II—II and III—III, respectively, in FIG. 1, FIG. 4 is a sectional view taken on the line IV—IV in FIG. 2, FIG. 5 is a sectional view taken on the line V—V in FIG. 1, FIG. 6 is a plan view on a larger scale than FIGS. 2-5 of a piece of a sheet material used in the apparatus.

FIGS. 7 and 8 are sectional views taken on the lines VII—VII and VIII—VIII, respectively, in FIG. 6.

The grain drying and storing plant shown comprises eight bins 1-8 supported by a common, plane floor 10 and forming two rows 1-4 and 5-8 separated by a space 9. All of the bins are provided with a horizontal, perforated partition 11 allowing a current of drying or cooling air to enter the grain from below. The bins are each provided with a rectangular discharge port 12 in the wall facing the space 9, the lower edge of said port being on a level with the partition 11. A belt conveyor 13 serving all of the bins 1-8 is arranged between the bin rows 1-4 and 5-8. The conveyor is surrounded by a tubular housing 14 having a rectangular cross-sectional shape and supported by the floor 10. The upper wall of said housing is provided with eight receiving ports 15 corresponding to the discharge ports 12 of the bins. A horizontal, perforated sheet 16 having the same width as the port 12 serves to carry over the grain emerging from the discharge orifice 12 to the upper face of the housing 14, said sheet 16 bridging the space between the lower edge of the discharge port 12 and the upper face of the housing 14. The sheet 16 forms the roof of a chamber 17 having a bottom 18, an inclined front wall 19 engaging the wall of the bin, and vertical side walls 20, 21. At the front end, the chamber is limited by a side wall of the housing 14. Each of the side walls 20, 21 is provided with an air inlet port 24, 25, respectively fitted with a slidable closure member 22, 23, respectively. The side walls 20, 21 are extended upwards beyond the plane of the sheet 16 and form together with an inclined wall member 26 a triangular hood the inner edges of which closely engage the wall of the bin near the vertical edges and the upper edge of the discharge port 12. At its outer end, the hood closely engages the upper face of the housing 14 near the edges of the receiving port 15. The receiving port 15 is fitted with a slidable closure member 27.

A wall member 28 closely engaging the opposed side walls of the bins 1-4 and 5-8 forms the roof of an air tunnel 9a. Said air tunnel is closed at both ends by an end wall. An axial fan 29 fitted in one of said end walls serves to blow in air into said tunnel.

The perforated sheet 16 is represented in more detail in FIGS. 6-8. Each of the holes of the sheet is formed by a slit 30 one edge 31 of which and an adjoining region 32 is pressed slightly out of the plane of the sheet so as to provide a trapezoid-shaped orifice 33 between the edges of the slit, the plane of said orifice being at approximately right angles to the plane of the sheet. In the sheet 16 said orifices are arranged so as to impart to a current of air emerging from said orifices in the chamber 17 a direction from the discharge port 12 towards the receiving port 15, whereby said current of air tends to convey the grain emerging through the discharge port 12 onward to the port 15, through which the grain falls down on the belt conveyor 13. The pressure in the chamber 17 is due to the fact that the chamber 17, when the closure members 22, 23 are withdrawn, is connected through the ports 24, 25 with the air tunnel 9a supplied with air by the fan 29.

The grain discharged by the delivery end of the conveyor enters a chute or gravity shaft 34 connected to an orifice 35 in the bottom of the housing 14 beside an end wall 37 of said housing.

The air flowing along the upper side of the sheet 16 at least partly flows out through the port 15 and onwards along the housing 14. Said current of air contains dust and chaff separated from the grain conveyed. To prevent the dust and chaff from accompanying the grain in the chute 34 the upper wall of the housing 14 near the delivery end of the conveyor is provided with an orifice 36 connected to a conduit 40 for the removal of the dust-laden air.

The air tunnel 9a also serves to supply the air to be blown into the bins from below through the perforated partitions 11, the chambers 38 arranged below said partitions being each connected with the air tunnel 9a through a port 39. Said ports may be provided with adjustable closure elements.

To facilitate a complete emptying of the bins the partitions referred to consist of sheets of the type shown in FIGS. 6–8 arranged in such a way that the air currents produced along the upper faces of said sheets tend to convey the material towards the discharge port of the bin (see FIG. 4, in which the directions of the air currents are marked with arrows).

The sheet 16 and the elements 18–21 and 26 forming the chamber at the lower face of the sheet and the hood above said sheet are joined to a section of the housing 14 so as to form a structural unit. This very much simplifies the assemblage of the conveyor system.

What we claim is:

1. Apparatus for the removal of granular material from containers of a storage plant, there being at least two containers or rows of containers separated by a space and each of said containers having a discharge port in a side wall thereof facing said space, the lower edges of said discharge ports being on a level with each other, said apparatus comprising a conveyor arranged in said space in the middle between said containers or rows of containers, said conveyor having a material carrying member substantially on a level with or slightly below the lower edges of said discharge ports, a tubular housing enclosing said conveyor having an upper, horizontal wall provided with inlet ports corresponding to the discharge ports of the containers and an outlet orifice for discharged material at the discharge end of the conveyor, sheet members arranged to bridge the gaps between the lower edges of said discharge ports and the adjacent edges of said upper, horizontal wall of said tubular housing, each of said sheet members having substantially the same width as the corresponding discharge port and forming a roof of a chamber having the same height as said housing, said chamber being arranged to be connected to the pressure side of a fan, each of said sheets being provided with a large number of slits shaped so as to provide upper orifices which are substantially vertical and face away from the discharge port, whereby the current of air discharged from said chamber through said orifices will tend to move the material emerging from the discharge port towards the corresponding inlet port of said housing.

2. Apparatus according to claim 1 in which the upper, horizontal wall of the housing also is provided with an orifice near the delivery end of the conveyor, said orifice being connected to a conduit for dust-laden air.

3. Apparatus as claimed in claim 1, which comprises a wall member closely engaging the opposing side walls of the containers above the discharge ports of the containers, said wall member forming the roof of an air tunnel extending along the containers and connected to the pressure side of the fan, and which also comprises a plurality of hoods extending within said tunnel and connected each to a discharge port of a container, each of said hoods having an inclined roof member extending from the upper edge of the discharge port to a part of the conveyor housing adjoining the edge of the corresponding inlet port remote from the discharge port, and side walls connected below to side walls of the chamber and to the upper wall of said housing in front of and behind the inlet port, with reference to the direction of transport of the conveyor, and in which at least one of the walls of the chamber extending at right angles to the direction of transport of the conveyor is provided with an orifice connecting said chamber to the air tunnel and with a slide member for closing said orifice.

4. Apparatus as claimed in claim 3 in which the inlet ports of the conveyor housing are each provided with a slidable closure member.

5. Apparatus as claimed in claim 3 or 4 in which at least one of said containers is provided with a horizontal partition arranged on a level with the lower edge of the discharge port, said partition comprising one or more sheets each of which is provided with a large number of slits each of which forms an orifice disposed in a vertical plane, said sheets forming the roof of a chamber connected to said air tunnel through an orifice, said slit orifices being directed so as to cause the current of air emerging through them from the underlying chamber to push the granular material towards the discharge orifice.

6. Apparatus as claimed in claim 3 or 4 in which the side walls of the chamber, the slitted roof sheet, the hood and a section of the conveyor housing which includes the inlet port form a structural unit.

7. Apparatus for the removal of granular material from any one of a plurality of containers arranged in a row, each of said containers being provided in a lower portion thereof with a discharge port in one side wall of the container, said side walls being aligned with each other, the lower edges of said discharge ports being on a level with each other, said apparatus comprising a tubular conveyor housing extending along said row of containers at a distance from said side walls, and a conveyor enclosed in said conveyor housing, said housing having a horizontal upper wall on a level with the lower edges of said discharge ports and provided with inlet ports corresponding to said discharge ports, an outlet orifice for discharged material being provided in said housing at the discharge end of the conveyor, a plurality of sheet members each of which is arranged to bridge the gap between the lower edge of one of said discharge ports and said upper wall of said housing at the corresponding inlet port, each of said sheet members being provided with a large number of slits shaped to provide upper orifices which are substantially vertical and face away from the discharge port, a plurality of hoods each of which covers the upper face of one of said sheet members and forms together therewith a channel connecting the discharge port with the inlet port, confining means arranged to constitute together with said aligned side walls an air tunnel enclosing said conveyor housing as well as all of said hoods and said sheet members, and a fan arranged to discharge atmospheric air into said air tunnel, whereby air escaping from the tunnel into said channels through the slits of said sheet members will tend to blow the granular material supported by said sheet members towards said inlet orifices.

* * * * *